Patented Sept. 26, 1950

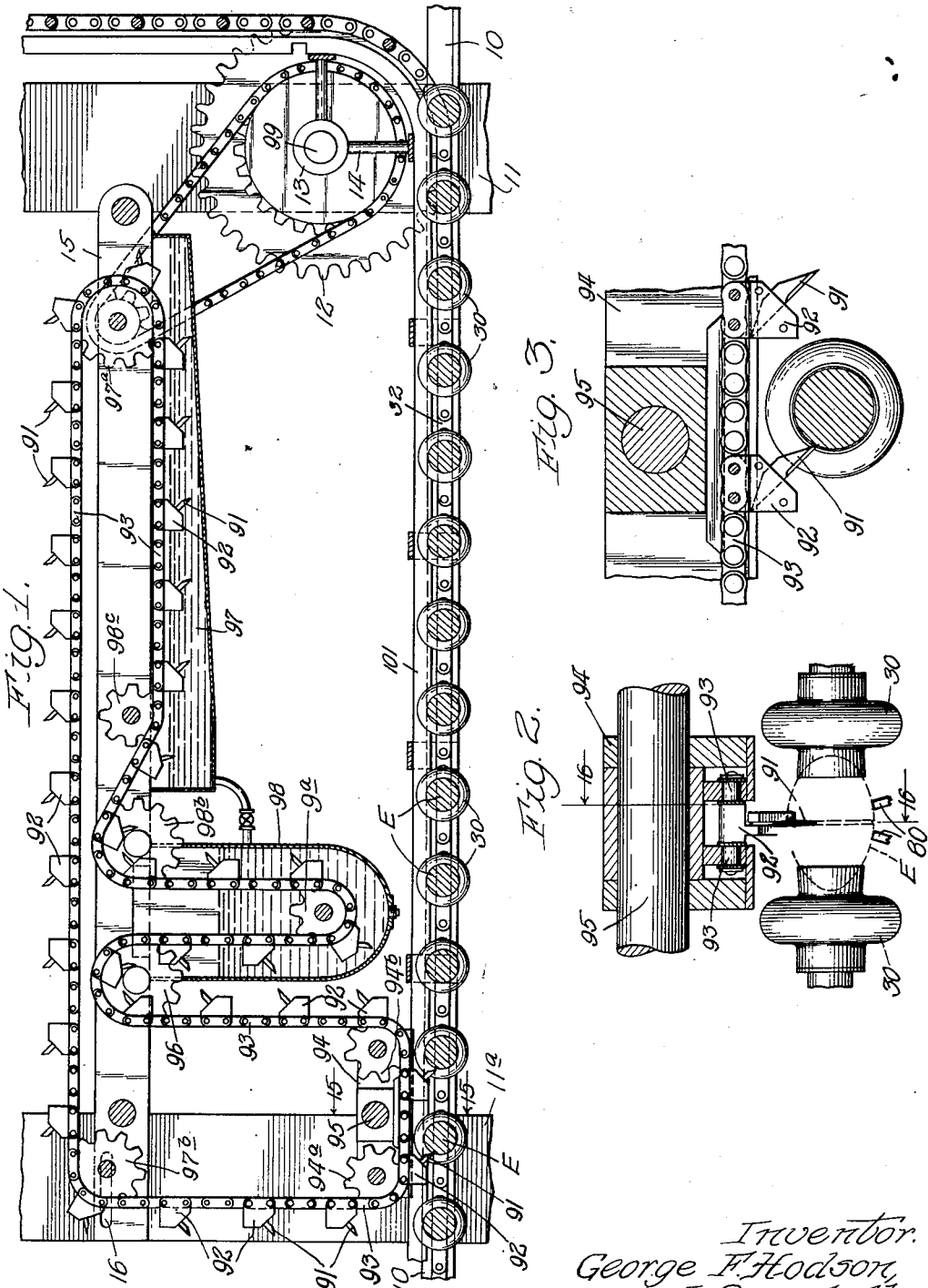

2,523,301

UNITED STATES PATENT OFFICE 2,523,301

EGG CUTTING DEVICE

George F. Hodson, Altus, Okla., and Lyman L. Campbell, Riverdale, Ill., assignors to Wilson & Company, Inc., a corporation of Delaware Application September 4, 1945, Serial No. 614,304

7 Claims. (Cl. 146—2)

1

The present invention relates to an egg cutting device and more particularly to a device adapted for use in an egg breaking machine for cutting the membrane of an egg.

The invention is especially designed for the egg breaking machine illustrated in the co-pending application of George F. Hodson, Serial No. 534,552, filed May 8, 1944, Patent No. 2,443,188, June 15, 1948, but is usable in other machines and systems.

An object of the invention is to provide a device for cutting the membrane of an egg without puncturing the yolk thereof.

Another object is to provide a device in which each knife blade is automatically cleaned and sterilized after each use, to avoid contaminating the contents of good eggs by mixing therewith a portion of the contents of a bad egg. It requires only a very small quantity of spoiled egg content to contaminate a batch of good eggs.

Other objects, advantages and features of the invention will be apparent from the following specification and the drawings, in which:

Fig. 1 is a side elevational view partly in section of the egg cutting device and adjoining parts of an egg breaking machine; Fig. 2 is a sectional view taken on the line 15—15 of Fig. 1; and Fig. 3 is a sectional view taken on the line 16—16 of Fig. 2.

In the embodiment of the invention shown in the drawings, 10 represents one of the two side frame members of an egg breaking machine, each of which is supported by two pairs of upright frame members 11 and 11a, only one of each pair being shown in the drawings. An endless chain 32 is carried on each frame member 10 and is driven by a sprocket wheel 12 on shaft 99 journaled in bearing 13 mounted on studs 14 attached to a member 11 attached to a frame member 10, as by brackets. The shaft 99 is driven by any suitable source of power (not shown).

Mounted in pairs on, and extending between, these chains 32 are a plurality of oppositely facing, rotatable vacuum cups 30, which are more fully described in our copending application, Serial No. 604,326, filed July 11, 1945, and between each pair is held an egg E, the shell of which has been previously scored through on the equator of the egg. After the scoring operation, the vacuum cups are preferably pulled slightly apart before the egg is advanced to the cutting zone. A method of pulling these cups apart and thereby exposing the membrane for cutting is also shown and described in our above mentioned co-pending application.

2

The cutting mechanism consists of a very sharp-pointed blade 91 directed at an angle of approximately 45° to the horizontal and adapted to cut completely through the membrane. The point of the blade is so positioned that it will completely sever the membrane on the smallest egg, but will not cut the yolk on the largest egg. Puncture of the egg is avoided by having the knife contact the membrane above the midsection of the egg; the yolk tending to seek the lower portion of the egg because of its greater specific gravity will not be contacted by the knife.

The blade is carried in a clamping device 92 which in turn is carried by a link chain 93 which is guided within the housing 94 which contains sprocket wheels 94a and 94b for the chain and which is suspended from the shaft 95. The chain 93 after passing through the housing 94 is carried upwardly over the wheel 96 through the bath 98, under the wheel 9a, over the wheel 98b, and under the wheel 98c, and then through the bath 97 of chlorinated water. The chain then passes over wheels 97a and 97b and downwardly to the wheel 94a in the housing 94. The chain is driven from the shaft 99.

The baths 97 and 98 are suspended from a pair of cross bars 15, each of which is attached to and extends between two of the oppositely disposed uprights 11 and 11a. These cross bars are also provided with journals for the shafts of the wheels 96, 97a, 97b, 9a and 98b, the shaft for the wheel 97b also extending through a slot 16 in the members 15 so as to provide for adjustment of the chain 93.

While being cut, the egg is in contact and rides on rubber guides 80 suitably mounted below the cups 30. This contact with the guides 80 causes the eggs E and cups 30 to rotate in a clockwise direction and, therefore, the egg membrane rises against the downwardly directed point of the knife 91 (see Fig. 3).

The two chains travel at the same speed and the distance between the eggs is the same as the distance between the knives. Thus each knife will contact an egg at the point shown in Figs. 2 and 3 for a sufficient time for the egg to make a complete revolution and hence have its membrane entirely cut. The knife will then be cleaned and sterilized before it is used again.

While we have shown and described certain embodiments of our invention, it is to be understood that it is capable of many modifications. Changes, therefore, in the construction and arrangement may be made without departing from the spirit and scope of the invention as disclosed in the appended claims.

We claim:

1. An egg cutting device for an egg breaking machine comprising a plurality of rotatable egg carrying means mounted on the machine for movement in a substantially linear path, a plurality of cutting means mounted on an endless flexible member moving in synchronism with the carrying means, means for holding a cutting means against a portion of an egg in a carrying means, and means for rotating the egg with the cutting means held against the egg to cause the cutting means to cut the egg.

2. The egg cutting device of claim 1 in which said egg is rotated at least 360° to cause the cutting means to cut completely around the egg.

3. The egg cutting device of claim 1 in which said cutting means is held against the egg at a point above the mid-section of the egg.

4. The egg cutting device of claim 3 in which said cutting means is held against the equatorial portion of the egg.

5. The egg cutting device of claim 1 in which said means for rotating the eggs comprises spaced parallel guide rails positioned to frictionally engage the lower side of the eggs whereby movement of the egg carrying means causes the egg to roll on the guide rails.

6. The egg cutting device of claim 1 including a cleaning bath and a sterilizing bath and in which said endless member is led through each of said baths successively to clean and then to sterilize the cutting means after each use.

7. In an egg breaking machine, an egg cutting device for cutting the membrane of an egg after the equatorial portion of the shell has been scored comprising, a plurality of rotatable egg carrying means mounted on the machine for movement in a linear path, a plurality of cutting blades mounted on an endless flexible member moving in synchronism with the carrying means, each of said cutting blades being sequentially positioned to pierce the membrane of an egg, and means for rotating the egg to cause the cutting blade to sever the membrane.

GEORGE F. HODSON.
LYMAN L. CAMPBELL.

REFERENCES CITED

The following references are of record in the file of this patent:

UNITED STATES PATENTS

| Number | Name | Date |
| --- | --- | --- |
| 1,407,524 | Fourchy | Feb. 21, 1922 |
| 1,474,717 | Holler | Nov. 20, 1923 |
| 1,795,118 | Hall | Mar. 3, 1931 |
| 1,916,596 | Winfree, Jr. | July 4, 1933 |
| 2,018,044 | Weiss | Oct. 22, 1935 |
| 2,173,278 | Kozelka et al. | Sept. 19, 1939 |
| 2,443,188 | Hodson | June 15, 1948 |